(12) United States Patent
Tanaka et al.

(10) Patent No.: US 6,743,392 B2
(45) Date of Patent: Jun. 1, 2004

(54) PRODUCTION DEVICE AND METHOD FOR OPENED FIBER BUNDLE AND PREPREG PRODUCTION METHOD

(75) Inventors: Kiyotsugu Tanaka, Shiga (JP); Hiroshi Ohtani, Shiga (JP); Hidetaka Matsumae, Ehime (JP); Seiji Tsuji, Osaka (JP); Daisaku Akase, Ehime (JP)

(73) Assignee: Toray Industries, Inc. (JP)

( * ) Notice: Subject to any disclaimer, the term of this patent is extended or adjusted under 35 U.S.C. 154(b) by 319 days.

(21) Appl. No.: 09/936,112

(22) PCT Filed: Jan. 11, 2001

(86) PCT No.: PCT/JP01/00079

§ 371 (c)(1),
(2), (4) Date: Oct. 12, 2001

(87) PCT Pub. No.: WO01/51265

PCT Pub. Date: Jul. 19, 2001

(65) Prior Publication Data

US 2003/0057585 A1 Mar. 27, 2003

(30) Foreign Application Priority Data

Jan. 12, 2000 (JP) .............................................. 2000-3350

(51) Int. Cl.[7] ........................ B29B 15/08; D01D 11/02; D02J 1/18; D06M 10/02
(52) U.S. Cl. ........................ 264/444; 28/282; 264/136; 264/137; 264/345
(58) Field of Search ........................... 264/69, 70, 136, 264/137, 345, 442, 444; 19/65 T; 28/282

(56) References Cited

U.S. PATENT DOCUMENTS

| 2,244,203 A | 6/1941 | Kern |
| 3,840,941 A | 10/1974 | Neveu .................. 19/65 T |
| 5,042,122 A | 8/1991 | Iyer et al. .................. 28/282 X |
| 6,094,791 A | * 8/2000 | Akase et al. .................. 28/282 |

FOREIGN PATENT DOCUMENTS

| EP | 0 292 266 A2 | 11/1988 | .................. 264/131 |
| EP | 0 393 420 B1 | 10/1990 | |
| JP | 61-275438 A | 12/1986 | |
| JP | 03-033222 A | 2/1991 | |
| JP | 03-124666 A | 5/1991 | |
| JP | 5140815 A | 6/1993 | |
| JP | 07-268754 A | 10/1995 | |
| JP | 08-150664 A | 6/1996 | |
| JP | 8337960 A | 12/1996 | |
| JP | 9085744 A | 3/1997 | |
| JP | 10-110346 A | 4/1998 | |
| JP | 10-292238 A | 11/1998 | |
| JP | 2000-226762 A | 8/2000 | |

\* cited by examiner

*Primary Examiner*—Leo B. Tentoni
(74) *Attorney, Agent, or Firm*—Piper Rudnick LLP

(57) ABSTRACT

An apparatus and method for producing a spread fiber bundle using a fiber-spreading device composed of a group of rollers and a base body reciprocated to be repetitively brought into contact with and kept away from a running fiber bundle, and a method for producing a prepreg. Fiber bundle can be stably and efficiently spread even in the case where the fiber bundle to be spread are filaments having a high elastic modulus such as carbon filaments or where the carbon fiber bundle conveying speed is higher.

18 Claims, 4 Drawing Sheets

PRODUCTION DEVICE AND METHOD FOR OPENED FIBER BUNDLE AND PREPREG PRODUCTION METHOD

TECHNICAL FIELD

The present invention relates to an apparatus for producing a spread fiber bundle and a method for producing a spread fiber bundle using the production apparatus, and further a method for producing a prepreg by impregnating a resin into a spread fiber bundle obtained by the production method.

BACKGROUND ART

Prepregs are widely used as intermediate base materials to be molded into aircraft materials, building materials, general industrial materials and sports and leisure articles. A prepreg is produced by a method of paralleling a plurality of fiber bundles, each consisting of a plurality of filaments, in the form of a sheet, thinly and uniformly spreading the plural filaments of the respective fiber bundles in a direction across the parallel direction (transverse direction), and impregnating spaces between the spread filaments with a matrix resin.

Applications of prepregs have been diversified. Prepregs having thin and small irregularity in thickness are demanded. To product such a prepreg, a technique for widely and thinly spreading a fiber bundle without degrading the bundle is necessary.

For spreading a fiber bundle, JP-56-43435-A teaches a method of spreading a fiber bundle, in which the fiber bundle is transferred in contact with plural rollers while being bent around the rollers, and is brought into pressure contact with a cylindrical body vibrating in the axial direction during such transfer operation. YP-61-275438-A discloses a method of spreading a fiber bundle, in which the fiber bundle is transferred in contact with a reciprocating body or rotating body, while being vibrated in the vertical direction, and furthermore brought into pressure contact with a body having a curved surface. JP-7-268754-A proposes a method of spreading a fiber bundle, in which the fiber bundle is transferred in contact with a group of rollers including an eccentrically rotating body, to be spread by means of the eccentrically rotating body.

However, in these spreading methods, the fiber bundle is brought into strong pressure contact with a spreading body The fiber bundle receives a strong abrasive force from the surface of the spreading body, and the abrasion causes several filaments composing the fiber bundle to be broken, thereby generating fuzz in the fiber bundle. In the worst case, the fiber bundle is cut off. Especially to produce a thin prepreg, widely spread thin fiber bundles are needed. In the case where such fiber bundle is produced by any one of the conventional methods, the fiber bundle must be more strongly pressed against the spreading body. In this case, the generation of fuzz in the fiber bundle or the breaking of the fiber bundle becomes a more serious problem.

Such problem becomes especially serious if the fiber bundle is composed of filaments having a high elastic modulus or if the fiber bundle transfer speed is higher. The prepreg produced by using such fiber bundles are low in grade.

To solve such problem, it is proposed to decrease the friction coefficient of the spreading body used for spreading the fiber bundle or to use ultrasonic vibration, but the problem is not sufficiently solved.

It is an object of the invention to provide an apparatus for producing a spread fiber bundle that allows a fiber bundle to be stably and efficiently spread even if the fiber bundle to be spread is composed of filaments having a high elastic modulus or even if the fiber bundle transfer speed (running speed) is high when the fiber bundle is spread, and to provide a method for producing a spread fiber bundle using the production apparatus, and also to provide a method for producing a prepreg by impregnating a resin into spread fiber bundles produced by the production method.

DISCLOSURE OF THE INVENTION

The apparatus for producing a spread fiber bundle of the invention to solve the above problem comprises a group of at least two rollers kept in contact with a running fiber bundle, and a base body reciprocating to be repetitively brought into contact with and kept away from the running fiber bundle as the axial center of said base body moves relatively to the running fiber bundle, said base body being provided between at least a pair of rollers adjacent to each other in said group of rollers.

In the invention, the base body means a member used for spreading a transferred fiber bundle.

Particularly, the base body is a rod circular or polygonal in the cross sectional form (the cross section at right angles to the longitudinal direction). In the case of a polygonal rod, it is preferable that the angles are rounded to some extent.

The base body can be either a fixed body comprising a rod like member supported at both of its end portions without being rotated around the axis in the longitudinal direction thereof or a rotatable body comprising a rod like member supported at both of its end portions rotatably around the axis in the longitudinal direction thereof.

The rotatable body can be either an active rotating body positively driven to rotate or a passive rotating body not positively driven to rotate. In the case of the rotatable body, the base body is usually a rotating roller. The rotating roller used as an active rotating body may be called a driven rotating roller, and the rotating roller used as a passive rotating body may be called a free rotating roller. The rotating body can be either a concentric rotating body in which its rotating axial center is concentric with the peripheral form in the cross sectional form of the base body or an eccentric rotating body in which its rotating axis is eccentric.

The material of the base body can be any material that assures a sufficient strength against repeated contact with and separation from the running fiber bundle, and carbon steel, stainless steel or ceramics can be preferably used.

It is preferable that the surface roughness expressed as the arithmetic mean roughness Ra measured according to JIS B 0601, of the portion of the base body to be kept in contact with the fiber bundles is 0.4 to 3.2. A more preferable range is 0.8 to 1.6.

In the invention, the reciprocation to cause repeated contact and separation means that the base body is reciprocated in such a manner that the state in which the base body is kept in perfect contact with the running fiber bundles (the body contact state) and the state in which the base body is perfectly kept away from the running fiber bundles (the body non-contact state) are periodically repeated.

In the body non-contact state, the running fiber bundle does not receive any pressure from the base body, and are slackened and substantially free from tension partially in the running direction. In this slackened state, the minimum tension acting on spread regions of the fiber bundle is substantially zero.

In the apparatus for producing a spread fiber bundle of the invention, it is preferable that the base body is provided together with one or more identical bodies.

A reciprocating direction of the base body is substantially perpendicular to a running direction (a transferring direction) of the running fiber bundle and substantially perpendicular to the widthwise direction of the running fiber bundle. In the case where the running fiber bundle runs in the horizontal direction, the reciprocating direction coincides with the vertical direction.

In the apparatus for producing a spread fiber bundle of the invention, it is preferable that the base body is a rotatable roller.

In the apparatus for producing a spread fiber bundle of the invention, it is preferable that at least one roller of the group of rollers, or at least one body of the base bodies comprises a roller having a plurality of fiber bundle support portions extending along a direction of the rotating axis of the roller and projected from the surface of the roller, at the periphery of the roller.

In the case where a roller having projected support portions is used, when the running fiber bundle contacts the projected support portions, the running fiber bundle is momentarily held and spread, and the state in which the spread portions are kept into contact with the subsequent projected support portions is sustained. In this state, even if the fiber bundle is falsely twisted, the projected support portions function to prevent the propagation of twisting, and as a result, the fiber bundle spreading action is stabilized.

In the apparatus for producing a spread fiber bundle of the invention, it is preferable that at least one of the rollers having projected support portions is positioned upstream of the base body and rotates in the same direction as the running direction of the fiber bundle, with its peripheral surface speed kept lower than the running speed of the fiber bundle.

In the apparatus for producing a spread fiber bundle of the invention, it is preferable that at least one of the rollers having projected support portions is positioned upstream of the base body and rotates in the direction reverse to the running direction of the fiber bundle.

In the apparatus for producing a spread fiber bundle of the invention, it is preferable that in the roller having projected support portions, the angle ($\theta$) formed between the respectively adjacent support portions at the roller axis is 5 to 50 degrees, while the relation between the height of each support portion (t) and the radius of the roller (r) satisfies formula $t > r[1/\cos(\theta/2) - 1]$. It is more preferable that the angle ($\theta$) is 10 to 40 degrees.

In the case where the angle ($\theta$) is less than 5 degrees, since the intervals of the respectively adjacent projected support portions are small, the effect of preventing false twisting is small. In the case where the angle ($\theta$) is more than 50 degrees, since the curvature of the fiber bundle kept in contact with the projected support portions becomes large, fuzz is likely to be generated in the fiber bundle.

In the case where the relation of formula $t > r[1/\cos(\theta/2) - 1]$ is not satisfied, i.e., in the case of $t \leq r[1/\cos(\theta/2) - 1]$, since the fiber bundle contacts the surface of the roller having projected support portions, the effect of preventing false twisting is small.

In the apparatus for producing a spread fiber bundle of the invention, it is preferable that at least one roller positioned downstream of the base body, of the group of rollers is a brake roller.

Since the use of a brake roller increases the tension of the fiber bundle after spreading, the running (transfer) of the spread fiber bundle becomes more stable.

In the apparatus for producing a spread fiber bundle of the invention, it is preferable that at least one roller positioned downstream of the base body, of the group of rollers is a dancer roller.

Since the use of a dancer roller decreases the variation in the tension acting on the spread regions of the fiber bundle, the efficiency of the operation to spread the fiber bundle can be enhanced.

The method of producing a spread fiber bundle of the invention for solving the above-mentioned problem comprises the use of the apparatus for producing a spread fiber bundle of the invention and the step of running the fiber bundle zigzag along the rollers of the group of rollers at a fiber bundle running speed of 3 to 20 m/min, with the base body reciprocated at a vibration frequency of 1 to 100 Hz with an amplitude of 1 to 25 mm, for spreading the fiber bundle.

It is preferable that the amplitude of the spreading body reciprocation is 1 to 5 mm. If the amplitude is more than 25 mm, the running of the fiber bundle may become unstable, and in an extreme case, it can happen that the fiber bundle deviates from the predetermined fiber bundle passage.

It is preferable that the vibration frequency of the spreading body is 3 to 60 Hz. If the vibration frequency is more than 100 Hz, fuzz may be generated in the fiber bundle.

To keep the fiber bundle spreading action more stable, it is preferable that the vibration frequency in the reciprocation of the base body increases with the increase of the fiber bundle running speed (transfer speed). It is preferable that if the fiber bundle running speed (transfer speed) is 3 to 10 m/min, the vibration frequency is 3 to 30 Hz, and that if the speed is more than 10 m/min, the vibration frequency is 30 to 60 Hz.

It is preferable that the running speed (transfer speed) of the fiber bundle to be spread is 3 to 20 m/min, and a more preferable range is 5 to 10 m/min. If the fiber bundle running speed (transfer speed) is less than 3 m/min, the spread fiber bundle production efficiency declines, and if more than 20 m/min, the fiber bundle spreading efficiency may decline.

The invention can be preferably used for spreading fiber bundle comprising carbon filaments or graphite filaments, but can also be used for spreading fiber bundle of glass filaments or fiber bundle of organic filaments having a high elastic modulus such as polyaramid filaments.

It is preferable that the number of filaments constituting each fiber bundle is 1,000 to 100,000. A more preferable range is 3,000 to 70,000.

It is preferable that the method of producing a spread fiber bundle of the invention has a step of heating the surface of at least one roller of the group of rollers, or the surface of at least one body of the base bodies, or the fiber bundles per se to a temperature of 70 to 250° C.

The fiber bundle may have an oil deposited for improving the bundling property. The fiber bundles to be used for producing prepregs may have a sizing agent deposited for improving the adhesion to the matrix resin.

In the case where the fiber bundle is spread, it is preferable to include a step of heating the fiber bundle using a heating means such as an infrared heater before and/or while spreading, for softening the oil or the sizing agent deposited on the fiber bundle, to enhance the efficiency of spreading action.

The oil or the sizing agent deposited on the fiber bundle can also be decreased or remove, as required, by letting the fiber bundle passes a bath containing an organic solvent or washing solution.

In the case of heating, it is preferable to heat the fiber bundle in a temperature range of preferably 70 to 250°, more preferably 70 to 180° C. in a state to soften the oil or the sizing agent deposited on the fiber bundle.

It is preferable that the method of producing a spread fiber bundle of the invention includes a step of hitting the fiber bundle by means of a reciprocating body or rotating body while heating the fiber bundle at a position upstream of the base body in the running direction of the fiber bundle.

This method promotes the softening of the oil or sizing agent deposited on the fiber bundle.

It is preferable that the method of producing a spread fiber bundle of the invention includes a step of vibrating the fiber bundle at a vibration frequency lower than the reciprocating vibration frequency of the base body by means of a reciprocating body or rotating body at a position upstream of the base body in the running direction of the fiber bundle.

This method slackens the fiber bundle in the state where the fiber bundle is kept away from the spreading body (non-contact state), to promote the spreading action. It is preferable that the vibration frequency lower than the reciprocating vibration frequency of the spreading body is 0.5 to 5 Hz, and a more preferable range is 1 to 3 Hz. In this case, it is preferable that the amplitude of vibration is 20 to 200 mm.

In the method of producing a spread fiber bundle of the invention, it is preferable that the tensile modulus of elasticity of the fiber bundle is 200 to 700 GPa.

The fiber bundle having a tensile modulus of elasticity of 350 to 700 GPa gives a better effect in the invention.

It is preferable that the method of producing a spread fiber bundle of the invention includes a step of blowing a gas to the running fiber bundle at a position at least either upstream or downstream of the base body in the running direction of the fiber bundle.

In the method of producing a spread fiber bundle of the invention, it is preferable that the temperature of the gas is 70 to 250° C. and that the gas blowing pressure is 0.1 to 0.5 MPa.

The gas can be blown at a position upstream or downstream of the base body in the running direction of the fiber bundle (transfer direction) However, if it is blown at a position upstream, the effect of spreading the fiber bundle can be further enhanced.

The gas blow gives an effect of spreading the fiber bundle more efficiently even in the case where the fiber bundle is strongly bundled due to the deposition of oil or sizing agent.

It is preferable that the temperature of the gas is 70 to 180° C., and that the gas blowing pressure is 0.2 to 0.5 MPa. The gas usually used is pressurized air, and the pressurized air can be supplied from a pressurized air source usually available in the production factory.

It is preferable that the method of producing a spread fiber bundle of the invention includes a step of supporting the fiber bundle on a belt having a width wider than the fiber bundle width and curved to be projected on the side to be kept in contact with the fiber bundle, at a position downstream of the base body in the running direction of the fiber bundle.

The use of the belt is effective for further enhancing the effect of spreading the fiber bundle.

As the supply source of the fiber bundle to be spread, usually bobbins having fiber bundle wound around them and installed on a creel are used. In this case, it is preferable that the resistance against the running fiber bundle, of the mechanism for supplying the fiber bundles from the bobbins, is changed as required for stabilizing the spread state of fiber bundle.

The method of producing a prepreg of the invention comprises the step of impregnating a resin into the spread fiber bundles produced according to the method of producing a spread fiber bundle of the invention The prepreg production method allows the production of a prepreg with a high grade that is small in thickness irregularity though the thickness is thin, and has a resin sufficiently impregnated in the filaments.

The resin used and the resin impregnation method are not especially limited. Examples of the resin include thermosetting resins such as epoxy resins, vinyl ester resins, unsaturated polyester resins and phenol resins, thermoplastic resins such as polyester resins, polyethylene resin, polycarbonate resins, polyether resins and polyamide resins, etc. An epoxy resin is often used.

Examples of the epoxy resin include bisphenol A epoxy resin, phenol novolak epoxy resin, cresol novolak epoxy resin, glycidylamine epoxy resin, alicyclic epoxy resin, urethane modified epoxy resin, brominated bisphenol A epoxy resin, etc.

One of these epoxy resins can be used, but two or more of them can also be used together. Furthermore, a liquid epoxy resin or a solid epoxy resin can also be used as it is. Usually, a curing agent is added to the epoxy resin used.

For impregnation, for example, a resin lowered in viscosity by heating or dissolving in a solvent can be impregnated into the fiber bundles. As another method, the fiber bundles can be held between two resin sheets respectively obtained by thinly and uniformly applying a resin to such a sheet as paper or resin film treated to be releasable, and the laminate is pressurized using a heating roller, etc.

THE BEST MODES FOR CARRYING-OUT THE INVENTION

The invention is described in more detail with reference to the drawings and examples.

The property values used in the examples described below were measured as follows or as specified below.

Tensile Modulus of Elasticity and Tensile Strength

The carbon fiber bundle to be measured was impregnated with an epoxy resin composition obtained by mixing 1,000 g (93.0 wt %) of Bakelite (registered trade mark) ERL-4221 produced by Union Carbide K.K., 30 g (3 wt %) of boron trifluoride monoethylamine ($BF_3$.MEA) and 40 g (4 wt %) of acetone, and the impregnated fiber bundle was heated at 130° C. for 30 minutes for curing, to obtain a resin-impregnated strand. The tensile modulus of elasticity and the tensile strength of it were measured according to the resin-impregnated strand testing method described in JIS R 7601.

Tension Acting on Fiber Bundle

A mechanical tensiometer was used. Digital Tensiometer Model DTM-5 KB produced by Shimpo Kogyo K.K. was used as the measuring instrument.

Spread Fiber Width

A ruler was kept closer to the running (transferred) fiber bundle, for visual measurement.

Generation of Fuzz

The fuzz of fiber bundle was visually observed and evaluated according to the following criterion:

Rank 5: Split fine fibers were not observed at all.

Rank 4: A few split fine fibers were observed.

Rank 3: Split fine fibers were observed but not wound around rollers.

Rank 2: Split fine fibers were observed and wound around rollers.

Rank 1: Split fine fibers were observed and wound around rollers, and furthermore, the fiber bundles were broken.

EXAMPLE 1

Figure 1:
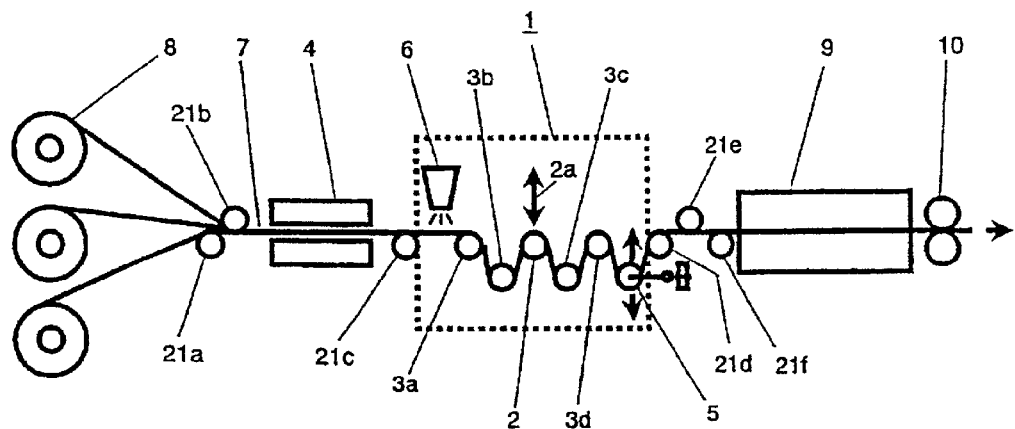
FIG. 1 is a schematic side view showing an example of the equipment for carrying out the prepreg production method of the invention.

In the equipment for carrying out the prepreg producing method of the invention shown in FIG. 1, plural (three in FIG. 1) fiber bundles 7 unwound from bobbins 8 having the fiber bundles 7 wound around them passed along guide rollers 21a and 21b, to be arranged in parallel in the transverse direction. Then, they passed through a preheater 4 and along a guide roll 21c, to reach a gas blower 6. The fiber bundles 7 passing under the gas blower 6 were introduced into a fiber-spreading device 1.

The fiber-spreading device 1 was provided with a first roller 3a, a second roller 3b, a base body 2, a third roller 3c, a fourth roller 3d and a dancer roller 5, from the upstream side to the downstream side in the running direction of the fiber bundles.

The fiber bundles 7 passing under the gas blower 6 to reach the fiber-spreading device 1 passed along the first roller 3a, the second roller 3b, the base body 2, the third roller 3c, the fourth roller 3d and the dancer roller 5 sequentially zigzag, being delivered from the fiber-spreading device 1.

The fiber bundles 7 delivered from the fiber-spreading device 1 passed along guide rollers 21d, 21e and 21f and were introduced into a resin-impregnating device 9. The fiber bundles 7 impregnated with a resin in the resin-impregnating device 9 had a form of a prepreg and were delivered from the resin-impregnating device 9, to be transferred to a post-treatment device (not illustrated).

Figure 2:
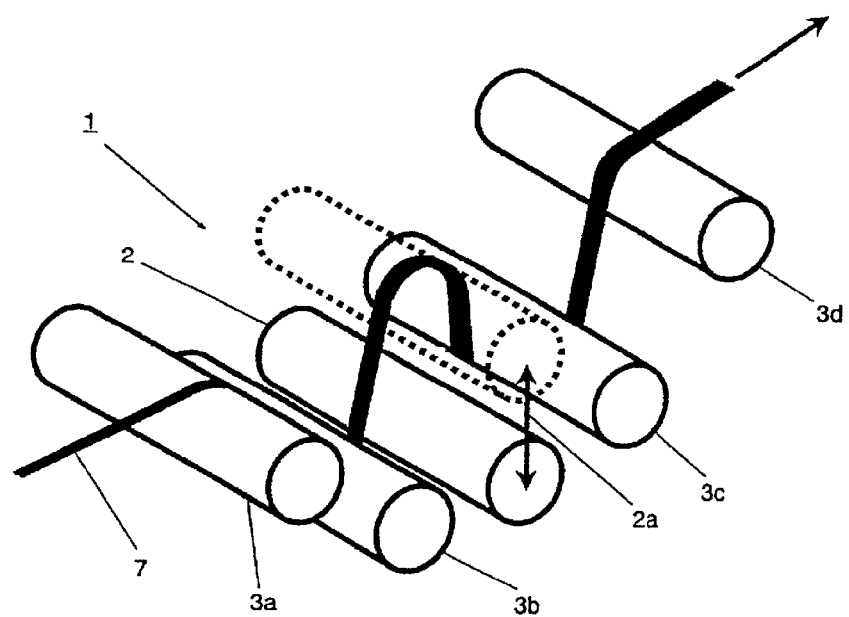
FIG. 2 is a schematic perspective view showing a partially enlarged fiber-spreading device in the apparatus for producing a spread fiber bundle shown in FIG. 1.

FIG. 2 is a perspective view showing the first roller 3a, the second roller 3b, the base body 2, the third roller 3c and the fourth roller 3d in the fiber-spreading device 1. In FIG. 2, the state in which the base body 2 is movable upwardly is indicated by a dotted line.

The fiber bundles 7 to be spread by the device were carbon fiber bundles having a tensile strength of 4,900 MPa and a tensile modulus of elasticity of 230 GPa, each bundle consisting of 12,000 filaments having an average filament diameter of 7 im.

While the fiber bundles 7 were taken up by means of the driven nip roller 10, they were unwound from the bobbins 8 installed on a creel. The tension acting on the fiber bundles 7 at the region where they were unwound was 1.6 N/bundle (N: Newton), and the transfer speed was 5 m/min.

The fiber bundles 7 were then introduced into the preheater 4 having an effective length of 1 m equipped with a far infrared heater with an output of 4 kW and heated to soften the sizing agent deposited on the fiber bundles 7. The atmosphere temperature in the preheater 4 was 100° C.

Then, while the fiber bundles 7 were continuously transferred, air was blown from the gas blower 6 at a pressure of 0.2 MPa, and the fiber bundles 7 were introduced into the fiber-spreading device 1 consisting of a free rotating roller with a diameter of 40 mm used as the base body 2 and a plurality of rollers 3a, 3b, 3c and 3d.

In the fiber-spreading device 1, the base body 2 was reciprocated at a vibration frequency of 10 Hz in the vertical direction, i.e., in the direction substantially perpendicular to the direction in which the fiber bundles 7 were transferred to be repetitively brought into contact with and kept away from the fiber bundles 7. The mechanism for reciprocating the base body 2 is not illustrated, and the reciprocating direction only is indicated by arrow 2a. This action caused the transferred fiber bundles 7 to be spread.

While the base body 2 was kept in contact with the fiber bundles 7, the base body 2 moved by a distance of 5 mm.

In this case, the tension acting on the spread regions of the fiber bundles 7 while the base body 2 was kept in contact with the fiber bundles 7 was maximum 3.2 N/bundle, and became minimum 0 N/bundle while the base body 2 was kept away from the fiber bundles 7.

The fiber bundles 7 which had a width of 7 mm before they were spread were spread to have an average width of 30 mm uniformly in the longitudinal direction of the fiber bundles 7, and the fiber spreading was satisfactory. The fuzz generation rank was 5, and the generation of fuzz was almost zero. Furthermore, breaking of the fiber bundles 7 was not observed.

Furthermore, the fiber bundles 7 passed along the dancer roller 5, to be finally spread, and they were introduced into the resin-impregnating device 9, to be impregnated with the resin. Then, they were taken up by means of the driven nip roller 10, to produce a prepreg.

EXAMPLE 2

Figure 3:
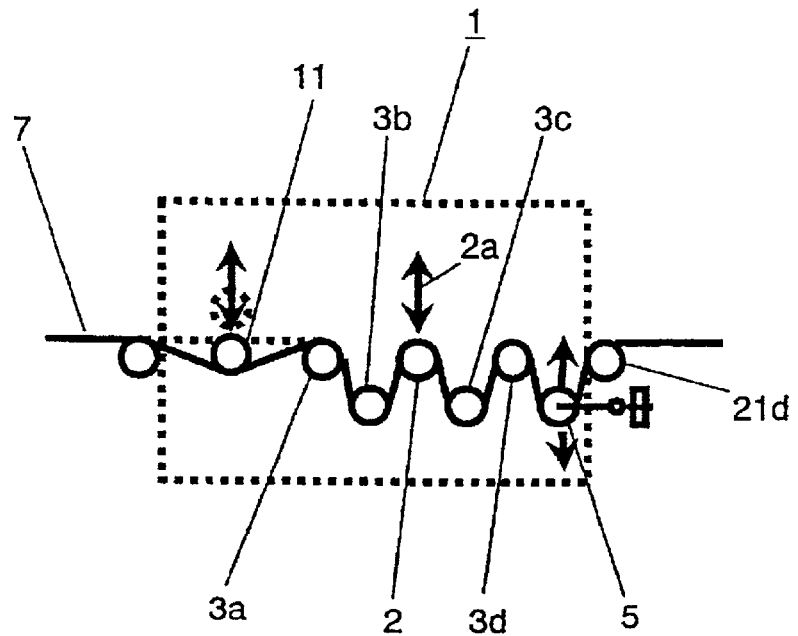
FIG. 3 is a schematic side view showing another embodiment in which the gas blower device in the apparatus for producing a spread fiber bundle shown in FIG. 1 is substituted by a vibration imparting body.

The spread fiber bundle-producing device of the invention shown in FIG. 3 has the same constitution as that of the device shown in FIG. 1, except that a vibrator 11 is used instead of the gas blower 6. The components of the device shown in FIG. 3, that are the same as those of the device shown in FIG. 1, are given the same symbols.

In this device, the fiber bundles 7 were spread as described for Example 1. Apart from the vibration of the base body 2, a free rotating roller with a diameter of 40 mm was used as the vibrator 11, to vibrate the fiber bundles 7 at a vibration frequency of 2 Hz with an amplitude of 50 mm.

In this case, the tension acting on the spread regions of the fiber bundles 7 while the base body 2 was kept in contact with the fiber bundles 7 was maximum 3.6 N/bundle, and became minimum 0 N/bundle while the base body 2 was kept away from the fiber bundles 7.

The fiber bundles 7 that had a width of 7 mm before they were spread were spread to have an average width of 30 mm uniformly in the longitudinal direction of the fiber bundles, and the fiber spreading was satisfactory. The fuzz generation rank was 5.

EXAMPLE 3

Figure 4:
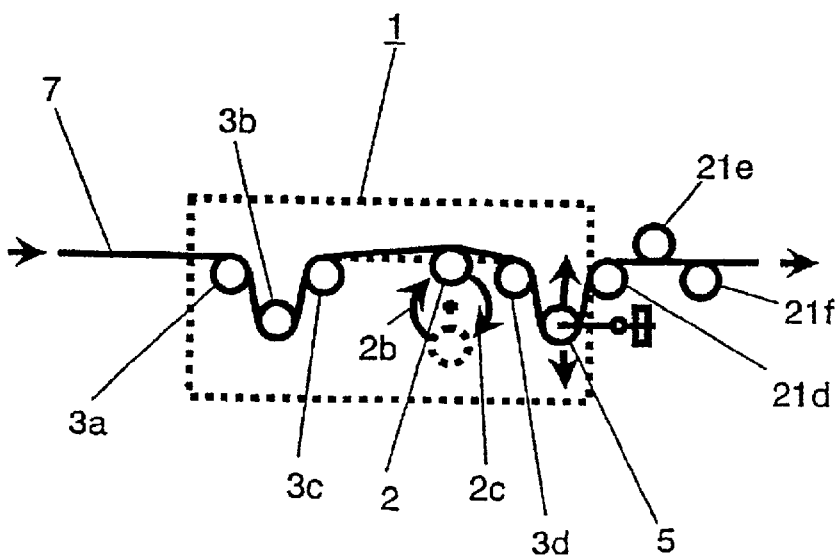
FIG. 4 is a schematic side view showing yet another embodiment in which the gas blower device in the apparatus for producing a spread fiber bundle shown in FIG. 1 is removed and the base body therein is replaced by another embodiment of base body.

The spread fiber bundle-producing apparatus of the invention shown in FIG. 4 has the same constitution as that of the apparatus shown in FIG. 1, except that the gas blower 6 is removed, that the base body 2 provided between the rollers 3b and 3c in the apparatus of FIG. 1 is provided between the rollers 3c and 3d, and that the base body 2 moves like circular arcs as indicated by arrows 2b and 2c instead of moving vertically unlike the base body 2 of FIG. 1. The components of the apparatus shown in FIG. 4, which are the same as those of the apparatus shown in FIG. 1, are given the same symbols.

In this apparatus, the fiber bundles 7 were spread as described for Example 1.

The tension acting on the spread regions of the fiber bundles 7 while the base body 2 was kept in contact with the fiber bundles 7 was maximum 2.8 N/bundle, and became minimum 0 N/bundle while the base body 2 was kept away from the fiber bundles 7.

The fiber bundles 7 that had a width of 7 mm before they were spread were spread to have an average width of 28 mm uniformly in the longitudinal direction of the fiber bundles, and the fiber spreading was satisfactory. The fuzz generation rank was 5.

EXAMPLE 4

Figure 5:
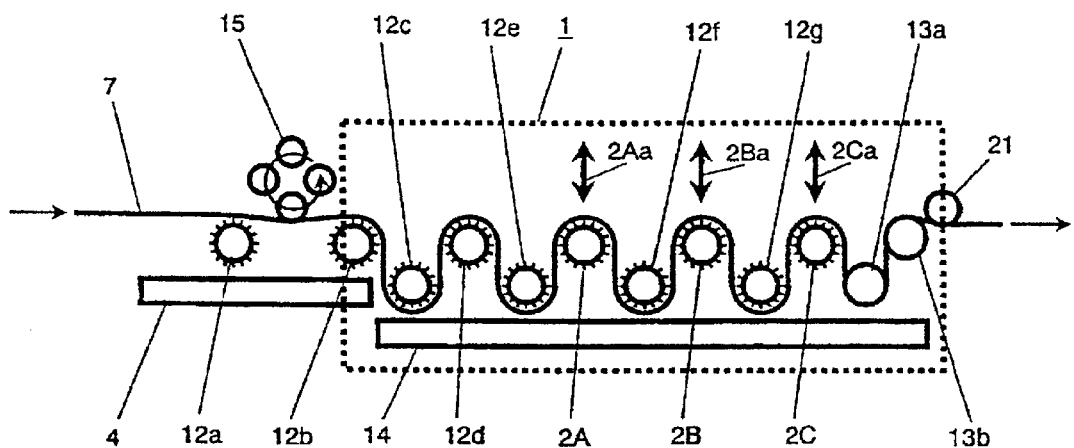
FIG. 5 is a schematic side view showing another example of the apparatus for carrying out a spread fiber bundle producing method of the invention.

The apparatus for carrying out the spread fiber bundle-producing method of the invention shown in FIG. 5 had a structure, in which the fiber bundles 7 unwound from the bobbins (not illustrated) having the fiber bundles wound around them pass along a first roller 12a, a rotating body 15 consisting of four small rollers, a second roller 12b, a third roller 12c, a fourth roller 12d, a fifth roller 12e, a first base body 2A, a sixth roller 12f, a second base body 2B, a seventh roller 12g, a third base body 2C, a first brake roller 13a, a second brake roller 13b and a guide roller 21 sequentially zigzag.

Under the first roller 12a, the rotating body 15 and the second roller 12b, a preheater 4 (identical with the preheater 4 of FIG. 1) is provided, and under the section ranging from the third roller 12c to the second brake roller 13b, a heater 14 is provided. Downstream of the guide roller 21, a driven nip roller like the driven nip roller 10 of the apparatus shown in FIG. 1 existed, though not illustrated.

Figure 6:
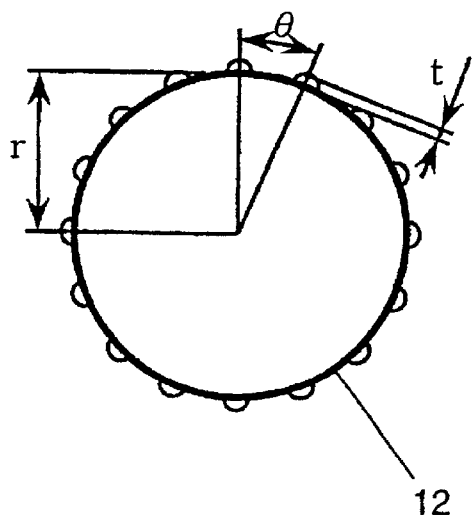
FIG. 6 is a schematic side view showing an example of a roller having projected support portions used in the spread fiber bundle producing apparatus of the invention.

FIG. 6 is a detailed side view showing one of the first rollers 12a through the seventh roller 12g of the apparatus shown in FIG. 5. In FIG. 6, the roller is indicated by symbol 12.

This apparatus was used to spread the fiber bundles 7 as described for Example 1. The tension acting on the fiber bundles 7 at the region where they were unwound and the transfer speed were the same as those of Example 1.

The fiber bundles 7 unwound from bobbins (not illustrated) were introduced into the preheater 4 having an infrared heater, to be heated, and as a result the sizing agent deposited on the fiber bundles 7 was softened. The atmosphere temperature in the preheater 4 was 100° C.

Then, while the fiber bundles 7 were continuously transferred, the rotating body 15 consisting of four free rotating rollers with a diameter of 45 mm was used to hit the fiber bundles 7 at a vibration frequency of 30 Hz for promoting the softening of the sizing agent. Subsequently, the fiber bundles 7 were introduced into the fiber-spreading device 1.

The fiber-spreading device consisted of three spreading bodies 2A, 2B and 2C, plural rollers 12a through 12g, two brake rollers 13a and 13b, and one heater 14.

All the base bodies 2A, 2B and 2C and plural rollers 12a through 12g are free rollers 12 having plural projected support portions extending in the axial direction of roller rotation (FIG. 6). The angle (θ) between the respectively adjacent projected support portions at the roller axis was a degree of 22.5; the height of each projected support portion (t), 2 mm; the roller radius (r), 28 mm; and the radius of each projected support portion at the tip, 2 mm.

The brake rollers 13A and 13B had a diameter of 80 mm respectively, and connected at their ends on one side with a powder brake mechanism (not illustrated). As the heater 14, a far infrared heater was used.

In the fiber-spreading device 1, the respective base bodies 2A, 2B and 2C reciprocated at a vibration frequency of 25 Hz in the vertical direction, i.e., in the direction substantially perpendicular to the direction in which the fiber bundles 7 were transferred, as indicated by arrows 2Aa, 2Ba and 2Ca, to repeat the contact with and separation from the fiber bundles 7.

This action caused the transferred fiber bundles 7 to be spread. In this case, while the respective base bodies 2A, 2B and 2C were kept in contact with the fiber bundles 7, the respective base bodies 2A, 2B and 2C moved by a distance of 2 mm.

In this case, the tension acting on the spread regions of the fiber bundles 7 while the base bodies 2A, 2B and 2C were kept in contact with the fiber bundles was maximum 3.2 N/bundle, and became minimum 0 N/bundle while the base bodies 2A, 2B and 2C were kept away from the fiber bundles 7. The tension acting after the fiber bundles 7 passed along the brake roller 13b increased to 4 N/bundle. The heating by means of the heater 14 kept the temperature of the atmosphere above the fiber-spreading device 1 at 100° C.

The fiber bundles 7 which had a width of 7 mm before they were spread were spread to have an average width of 30 mm uniformly in the longitudinal direction of the fiber bundles, and the fiber spreading was satisfactory. The fuzz generation rank was 5, and fuzz generation was almost zero Furthermore, the breaking of the fiber bundles 7 was not observed.

Comparative Example 1

Figure 7:
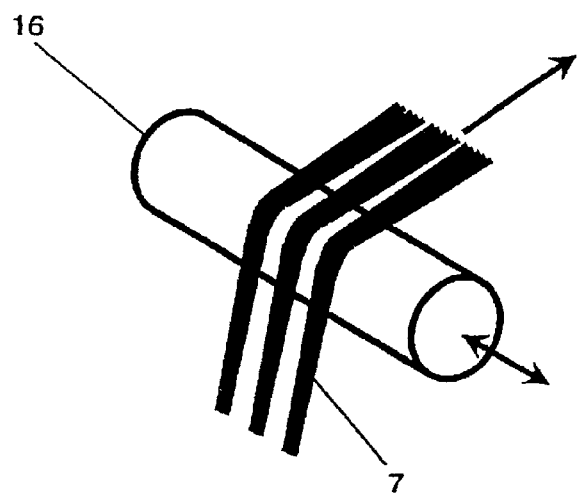
FIG. 7 is a schematic perspective view showing an example of a cylinder vibrating in the axial direction used in the conventional spread fiber bundle producing.

Fiber bundles 7 were spread as described for Example 1, except that a cylinder 16 vibrating in the axial direction described in JP-56-43435-A mentioned above and approximately shown in FIG. 7 was used instead of the base body 2 shown in FIG. 1 and that the preheater 4, the dancer roller 5 and the gas blower 6 were not used.

The tension acting on the spread regions of the fiber bundles 7 changed between 0.8 and 2.4 N/bundle in relation with the motion cycles of the axially vibrating cylinder 16.

The fiber bundles 7 that had a width of 7 mm before they were spread were spread to have an average width of 15 mm in the longitudinal direction of the fiber bundles, and the fiber spreading was not satisfactory in view of spread fiber bundles for producing a prepreg of good quality. The fuzz generation rank was 3.

Comparative Example 2

Figure 8:
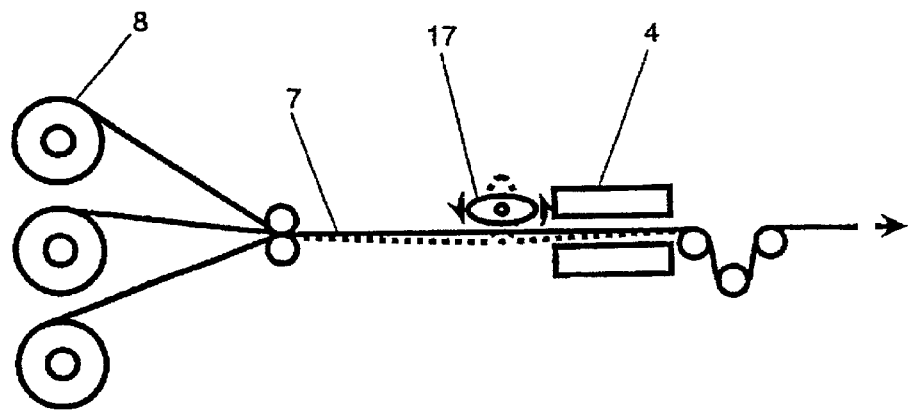
FIG. 8 is a schematic side view showing an example of the apparatus for carrying out the conventional spread fiber bundle producing method.

Fiber bundles were spread as described for Example 1, except that an oval rotating body 17 described in JP-61-275438-A mentioned above and approximately shown in FIG. 8 was used instead of the base body 2 shown in FIG. 1, that the preheater 4 was positioned downstream of the rotating body 17, and that the dancer roller 5 and the gas blower 6 shown in FIG. 1 were not used. The vibration frequency of the rotating body 17 was 100 Hz.

In this case, the tension acting on the spread regions of the fiber bundles 7 while the rotating body 17 was kept in contact with the fiber bundles was maximum 4.8 N/bundle, and became minimum 0.2 N/bundle while the rotating body 17 was kept away from the fiber bundles 7.

The fiber bundles 7 which had a width of 7 mm before they were spread were spread to have an average width of 20 mm in the longitudinal direction of the fiber bundles, and the fiber spreading effect was rather insufficient. The fuzz generation rank was 3.

Comparative Example 3

Figure 9:
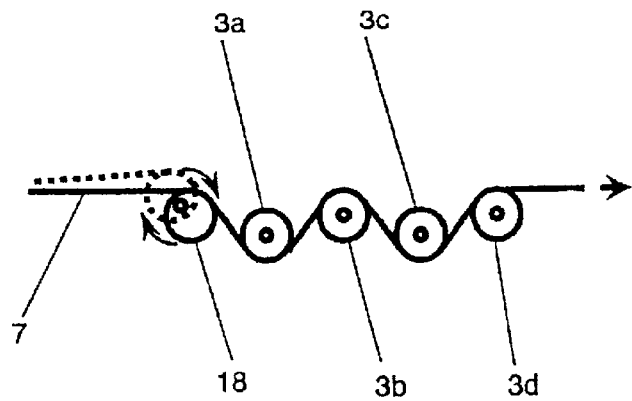
FIG. 9 is a schematic side view showing another example of the apparatus for carrying out the conventional spread fiber bundle producing method.

Fiber bundles 7 were spread as described for Example 1, except that an eccentrically rotating roller 18 described in JP-7-268754-A mentioned above and approximately shown in FIG. 9 was used instead of the base body 2 shown in FIG. 1, and that the preheater 4, the dancer roller 5 and the gas blower 6 were not used.

In this case, the fiber bundles 7 were not sufficiently slackened, and the tension acting on the fiber bundles changed in a range of 0.8 to 2.4 N/bundle in relation with the rotation cycles of the eccentrically rotating roller 18.

The fiber bundles 7 which had a width of 7 mm before they were spread were spread to have an average width of 15 mm in the longitudinal direction of the fiber bundles. The fiber spreading effect was insufficient. The fuzz generation rank was 4.

Industrial Applicability

The spread fiber bundle-producing apparatus of the invention and the spread fiber bundle-producing method using the production apparatus allow fiber bundle to be stably spread at high efficiency without generating, for example, fuzz in the fiber bundles, even in the case where the fiber bundle comprises filaments having a high elastic modulus or where the transfer speed is higher.

The prepreg obtained by impregnating a resin into the fiber bundles spread by the spread fiber bundle-producing method has a high grade since the thickness irregularity is very small even though the thickness is thin.

What is claimed is:

1. An apparatus for producing a spread fiber bundle, comprising a group of at least two rollers kept in contact with a running fiber bundle, and a base body reciprocating to be repetitively and periodically repeatedly brought into contact with and kept away from the running fiber bundle as the axial center of said base body moves relative to the running fiber bundle, the arrangement being such that the remaining fiber bundle between the rollers does not receive pressure in the non-contact state, said base body being provided between at least a pair of rollers adjacent to each other, of said group of rollers.

2. An apparatus for producing a spread fiber bundle according to claim 1, wherein the number of said base body is at least two.

3. An apparatus for producing a spread fiber bundle according to claim 1 or 2, wherein the base body is a rotatable roller.

4. An apparatus for producing a spread fiber bundle according to claim 1, wherein at least one roller of said group of rollers or at least one of said base bodies comprises a roller having a plurality of projected support portions extending along a direction of the rotating axis of the roller and projected from the surface of the roller, at the periphery of the roller.

5. An apparatus for producing a spread fiber bundle according to claim 4, wherein at least one of said rollers having projected support portions is positioned upstream of said base body, and is rotated in the same direction as the running direction of the running fiber bundle, with its peripheral surface speed kept lower than the running speed of the running fiber bundle.

6. An apparatus for producing a spread fiber bundle according to claim 4, wherein at least one of said rollers having projected support portions is positioned upstream of said base body, and is rotated in the direction reverse to the running direction of the running fiber bundle.

7. An apparatus for producing a spread fiber bundle according to any one of claims 4 through 6, wherein in said roller having projected support portions, the angle (θ) formed between the respectively adjacent support portions at the roller axis is 5 to 50 degrees and the relation between the height of each support portion (t) and the radius of the roller (r) satisfies formula $t > r[1/\cos(\theta/2) - 1]$.

8. An apparatus for producing a spread fiber bundle according to claim 1, wherein at least one roller positioned downstream of said base body, of said group of rollers is a brake roller.

9. An apparatus for producing a spread fiber bundle according to claim 1, wherein at least one roller positioned downstream of said base body, of said group of rollers is a dancer roller.

10. A method for producing a spread fiber bundle, with an apparatus for producing a spread fiber bundle as set forth in claim 1, comprising running a fiber bundle zigzag along said rollers of said group of rollers at a fiber bundle running speed of 3 to 20 m/min, with said base body reciprocated at a vibration frequency of 1 to 100 Hz with an amplitude of 1 to 25 mm, for spreading the fiber bundle.

11. A method for producing a spread fiber bundle according to claim 10, further comprising heating a surface of at least one roller of said group of rollers or a surface of at least one base body of said base bodies, or the fiber bundle per se.

12. A method for producing a spread fiber bundle according to claim 10 or 11, further comprising hitting the fiber bundles with a reciprocating body or a rotating body while heating the fiber bundle at a position upstream of said base body in the running direction of the fiber bundle.

13. A method for producing a spread fiber bundle according to claim 10 or 11, further comprising vibrating the fiber bundle with a reciprocating body or a rotating body at a vibration frequency lower than that of the reciprocating vibration frequency of said base body, at a position upstream of said base body in the running direction of the fiber bundle.

14. A method for producing a spread fiber bundle according to claim 10, wherein the tensile modulus of elasticity of the fiber bundle is 200 to 700 GPa.

15. A method for producing a spread fiber bundle, according to claim 10, further comprising blowing a gas onto the running fiber bundle at a position at least either upstream or downstream of said base body in the running direction of the fiber bundle.

16. A method for producing a spread fiber bundle according to claim 15, wherein the temperature of the gas is 70 to 250° C. and the gas blowing pressure is 0.1 to 0.5 MPa.

17. A method for producing a spread fiber bundle according to claim 10, further comprising supporting the running fiber bundle on a belt having a width wider than that of the fiber bundle width and curved to be projected on the side to be kept in contact with the fiber bundle, at a position downstream of said base body in the running direction of the fiber bundle.

18. A method for producing a prepreg comprising impregnating a resin into spread fiber bundles produced according to the method of producing a spread fiber bundle as set forth in claim 10.

* * * * *